(12) United States Patent
Mosley (10) Patent No.: US 8,881,628 B2
(45) Date of Patent: Nov. 11, 2014

(54) CARPET RECYCLING MACHINE

(75) Inventor: John Reginald Mosley, Huddersfield (GB)

(73) Assignee: Sellers Engineers Limited, Yorkshire (GB)

( * ) Notice: Subject to any disclaimer, the term of this patent is extended or adjusted under 35 U.S.C. 154(b) by 290 days.

(21) Appl. No.: 13/574,687

(22) PCT Filed: Jan. 28, 2011

(86) PCT No.: PCT/GB2011/050143
§ 371 (c)(1),
(2), (4) Date: Jul. 23, 2012

(87) PCT Pub. No.: WO2011/092508
PCT Pub. Date: Aug. 4, 2011

(65) Prior Publication Data
US 2012/0291601 A1 Nov. 22, 2012

(30) Foreign Application Priority Data
Jan. 29, 2010 (GB) .................................. 1001431.4

(51) Int. Cl.
B26D 5/00 (2006.01)
(52) U.S. Cl.
USPC ................................. 83/72; 83/76.7; 83/368
(58) Field of Classification Search
USPC ..................... 83/72, 76.7, 364, 368
See application file for complete search history.

(56) References Cited

U.S. PATENT DOCUMENTS

| 4,441,396 | A |   | 4/1984 | Mercier et al. |
| 5,704,104 | A | * | 1/1998 | Bacon et al. ..................... 28/299 |
| 5,908,164 | A | * | 6/1999 | Robinson et al. ................ 241/19 |
| 5,916,410 | A | * | 6/1999 | Goulet et al. .................. 156/701 |
| 6,029,916 | A | * | 2/2000 | White ......................... 241/24.19 |
| 6,182,913 | B1 | * | 2/2001 | Howe et al. ........................ 241/1 |
| 8,360,348 | B2 | * | 1/2013 | Levy et al. .................. 241/24.19 |
| 8,408,968 | B2 | * | 4/2013 | Gillis et al. ...................... 451/28 |
| 8,669,297 | B2 | * | 3/2014 | Evans et al. .................. 521/46.5 |
| 2011/0208196 | A1 | * | 8/2011 | Radermacher et al. ......... 606/82 |
| 2012/0037734 | A1 | * | 2/2012 | Levy et al. ................... 241/24.29 |
| 2012/0291601 | A1 | * | 11/2012 | Mosley ............................. 83/72 |

FOREIGN PATENT DOCUMENTS

| GB | 598297 | 2/1948 |
| GB | 742057 | 12/1955 |

(Continued)

OTHER PUBLICATIONS

May 25, 2010 Combined Search and Examination Report issued in British Patent Application No. GB1001431.4.

*Primary Examiner* — Sean Michalski
(74) *Attorney, Agent, or Firm* — Oliff PLC (57) ABSTRACT

A carpet recycling machine includes a carpet-pile removal machine and a carpet-thickness identification means. The carpet-thickness identification means is incorporated in a carpet handling system that includes a conveyor. In use, carpet is placed pile down on one end of the conveyor which feeds the carpet in to the carpet-pile removal machine. The carpet is urged to pass the carpet-thickness identification means, which measures the thickness of the carpet's backing substrate. This measurement is used to control an offset setting means of the carpet-pile removal machine in order to set an offset between a blade and first roller. Thus the height that the blade cuts the carpet can be set for each piece of carpet processed. As the carpet continues past the carpet-thickness identification means, towards the carpet-pile removal machine, the carpet is urged into the carpet-pile removal machine to be separated in to pile and backing substrate.

15 Claims, 8 Drawing Sheets

(56) References Cited

FOREIGN PATENT DOCUMENTS

| GB | 894491 | 4/1962 |
| GB | 1 332 869 | 10/1973 |
| GB | 2 087 291 A | 5/1982 |
| GB | 2 355 071 A | 4/2001 |
| JP | A-2006-433 | 1/2006 |
| RU | 2 182 707 C1 | 5/2002 |

\* cited by examiner

Figure 1

(PRIOR ART)

CARPET RECYCLING MACHINE

The present invention relates to a machine for recycling textile based products having fibre or pile woven onto a backing substrate. The machine is particularly useful for recycling used carpets, carpet tiles and other floor coverings or the alike (herein referred to as carpet).

It is known to recycle carpets using a splitting machine. Splitting machines are widely used in the leather processing industry to split hides of leather. A splitting machine disclosed as being suitable for recycling carpet is described in U.S. Pat. No. 4,441,396. For detailed background knowledge reference is made to U.S. Pat. No. 4,441,396 which is hereby incorporated by reference. In summary however, and with reference to FIGS. 1 and 2 a brief description of U.S. Pat. No. 4,441,396 follows.

Figure 1:
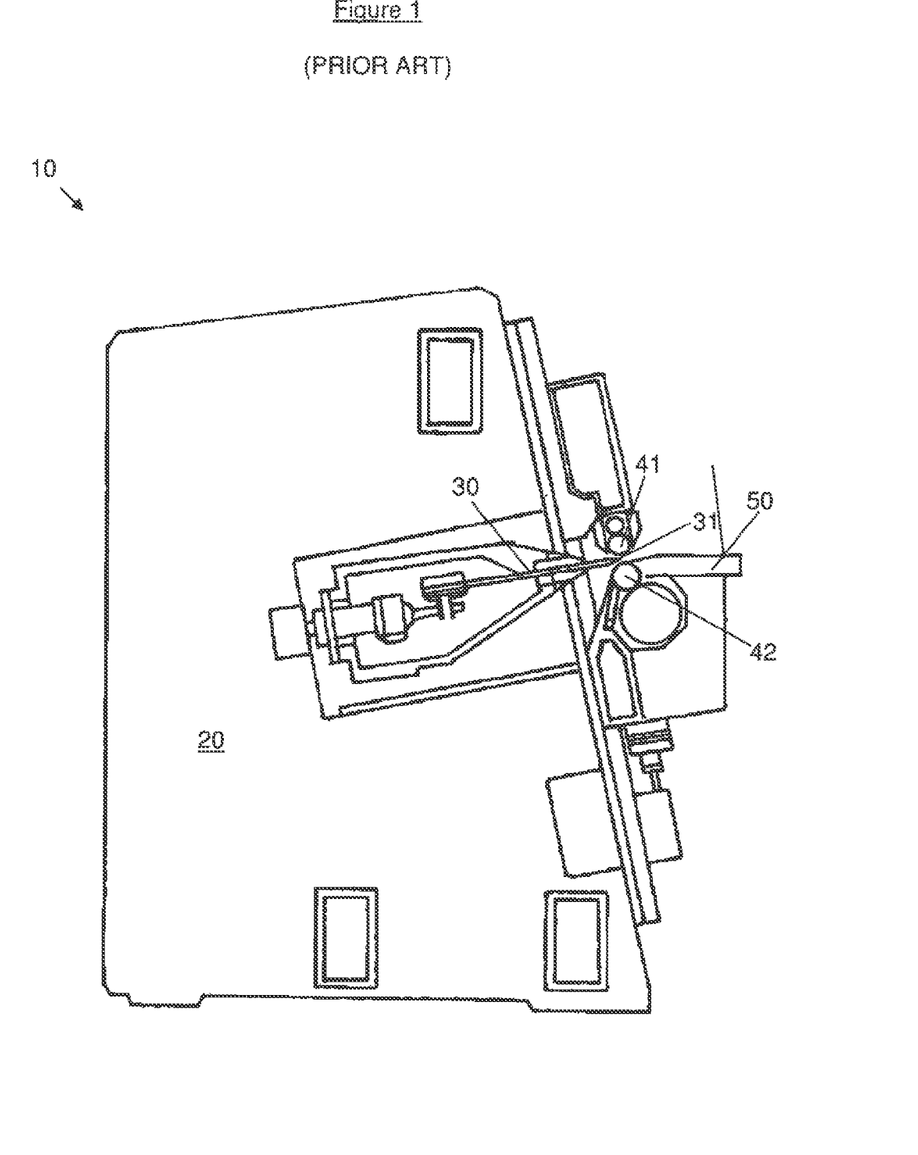
FIG. 1 shows a cross section through a prior art splitting machine.

With reference to FIG. 1, a splitting machine 10 comprises a housing 20 that supports a continuous cutting blade 30. The cutting blade 30 forms a horizontally mounted band that runs in a loop such that a blade edge 31 runs substantially horizontally across an entrance to the machine. Top and bottom rollers 41, 42 are located either side of the cutting blade edge. Carpet is fed into the entrance of the machine along a platform 50. Accordingly, the rollers 41, 42 may be driven in order to feed the carpet through the machine. In use, the blade 30 is offset from one of the rollers 41, 42 by the distance of the backing substrate. Consequently, the cutting blade severs the pile from the backing substrate as carpet is fed into the machine. Thus the pile and backing substrate can be recycled or disposed of separately.

Figure 2:
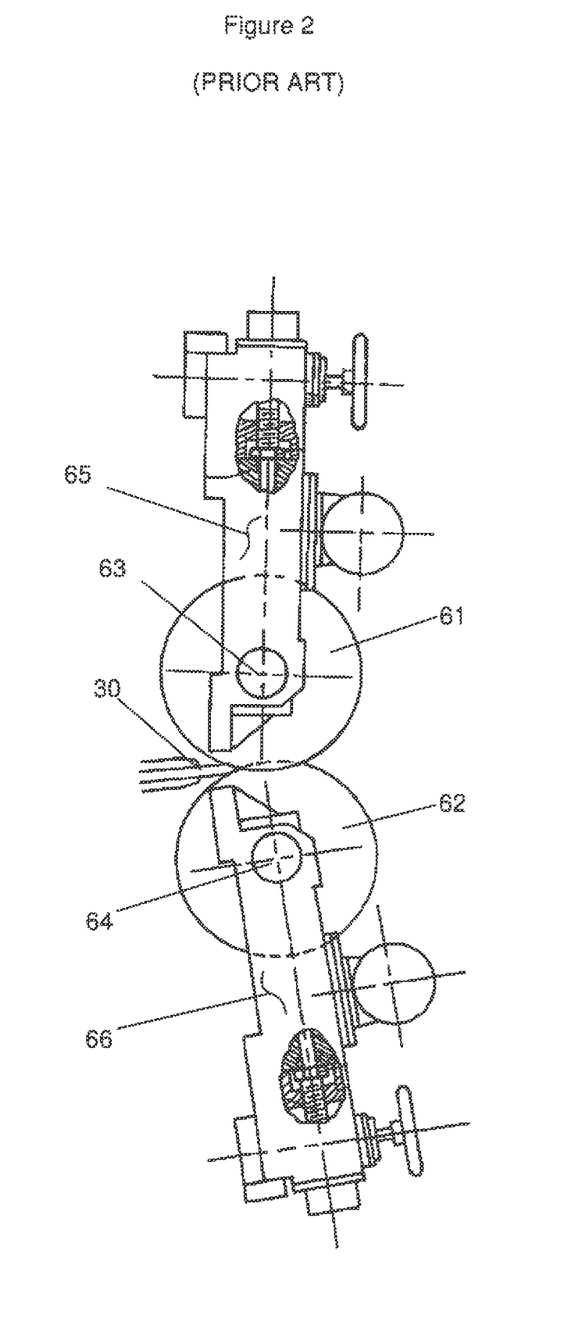
FIG. 2 shows a portion of a prior art splitting machine for sharpening a blade of the splitting machine of FIG. 1.

As shown in FIG. 2 in order to maintain the sharpness of the cutting blade 30, grinding wheels 61, 62 are provided. The grinding wheels 61, 62 may be provided on either side of the working area of the platform 50. Consequently, they do not interfere with the cutting process. In use, the cutting blade continuously moves allowing the grinding wheels 61, 62 to constantly work a new area of the blade. The grinding wheels 61, 62 are driven to rotate about axis 63, 64. It will be appreciated that, as the grinding wheels sharpen the cutting blade, they gradually wear away. Accordingly, the grinding wheels 61, 62 are arranged on moveable supports 65, 66. The moveable supports enable the grinding wheels to be moved towards the cutting blade as the grinding wheels wear away. Also, because the cutting blade is ground away, the machine includes means to advance the blade forwardly so that the blade edge remains in place relative to the rollers 41, 42.

Known splitting machines to date require the substrates to be hand fed into the opening of the machine. Moreover, a user is required to constantly monitor the grinding wheels 61, 62 and incrementally hand adjust the moveable supports 65, 66 of the grinding wheels as they wear. Furthermore, since carpets have different backing substrate thicknesses, it is not possible to process different batches of carpet without the risk of shearing through the backing substrate or not removing sufficient pile from the substrate.

Many countries are now requiring carpet manufacturers and waste handling organisations to reduce the amount of carpet sent to landfill. Moreover, there is increasing demand for recycling the bitumen based backing substrate of some carpets (particularly in the UK and Europe), whilst other opportunities exist in recycling the pile (particularly in the US where heavier piles are used). Whether recycling the pile or backing substrate, it is important that as much of the pile is removed from the backing substrate as possible. This is complicated as different carpets have varying height pile and thickness of the backing substrate. Moreover, incorporating parts of backing substrate within the separated pile reduces the value and worth of the pile. Consequently, it is desirable to provide a splitting machine capable of processing large volumes of carpet, within an automated environment.

It is an object of the present invention to overcome at least one of the above or other identified problems. It is a further aim to provide a carpet recycling machine that is able to reliably and repeatably process carpet in a production environment. A particular aim is to increase the automation of the carpet recycling machine and to remove user input. It is a further aim to provide a carpet recycling machine that separates pile from the backing substrate with reduced contamination of the two.

According to the present invention there is provided a carpet recycling machine, a carpet-pile removal machine for use in the carpet recycling machine, a carpet handing system for feeding the carpet-pile removal machine and a method of recycling carpet as set forth in the appended claims. Other features of the invention will be apparent from the dependent claims, and the description which follows.

According to a first aspect of the present invention there is provided a carpet recycling machine. The carpet recycling machine comprises a carpet-pile removal machine and a carpet-thickness identification means. Here the carpet-pile removal machine includes a first roller and a blade. The blade is mounted within the carpet-pile removal machine to be parallel to, and spaced from the first roller. The carpet-pile removal machine further includes offset setting means for controlling the position of the first roller relative to the blade in order to control the offset between the roller and blade. The carpet-thickness identification means determines the thickness of a backing substrate of a piece of carpet being processed and communicates with the offset setting means in order to set the offset between the blade and first roller of the carpet-pile removal machine for each piece of carpet being processed.

The carpet thickness identification means preferably includes a probe that is arranged to penetrate the pile and measure the gap between a datum and tip of the probe. Here, the back of the carpet is arranged on the datum so that the gap corresponds to the thickness of the carpet. When the carpet is measured in a flat state, it is advantageous if a part of the probe moves towards and away from the datum in a direction perpendicularly away from the carpet and also in a direction of the plane of the carpet. Consequently, the probe acts to sweep through the pile and therefore reduces the chance of pile being trapped between the probe and carpet backing which would distort the reading, as compared to the chances of pile being trapped if the probe was only moved in a direction perpendicularly away from the carpet backing. For instance, preferably the part of the probe is arranged to move in an arcuate path. Suitably therefore, the probe may be elongate and pivoted about a rotation axis spaced from the tip.

The carpet recycling machine may include more than one carpet-thickness identification means dependant on the application. Here the offset setting means may set the offset between the blade and roller based on an average of readings.

Preferably the carpet-thickness identification means comprises an anvil and opposed moveable probe. Here, carpet is urged between the anvil and opposed moveable probe in order to move the moveable probe away from the anvil. The moveable probe is arranged to penetrate the pile of the carpet being processed but not to penetrate the carpet's backing substrate. Deflection measurement means is provided to measure the movement of the opposed probe. Here the measurement is used to set the offset setting means. Preferably the carpet-thickness identification means includes a biasing means to bias the probe toward the anvil. This is advantageous as it ensures an accurate measurement. A particularly suitable arrangement of the carpet-thickness identification means is to provide a plurality of moveable probes arranged about a rotatably mounted carousel. Here movement of the carpet beneath the anvil causes the carousel to rotate. This is advantageous as the rotation causes each probe of the plurality of probes to penetrate through the pile in a sweeping motion. Consequently it reduces the risk of pile becoming trapped between the probe and anvil which would otherwise thereby distort the measurement.

The carpet-thickness identification means may be mounted to the carpet-pile removal machine or alternatively may be incorporated within a carpet handling system. The carpet handling system and carpet-pile removal machine may be in accordance with the following aspects. It will therefore be appreciated that whilst the carpet-thickness identification means has been described in relation to a carpet recycling machine, carpet-pile removal machine, and carpet handling system, it can be used separately or in conjunction with other equipment.

According to a second aspect of the present invention there is provided a carpet-pile removal machine. Here the carpet-pile removal machine comprises a blade and first roller. The blade is mounted within the carpet-pile removal machine so that the blade is in a fixed location. The first roller is moveably mounted within the carpet-pile removal machine parallel to and spaced from the blade. Here the carpet-pile removal machine further includes offset setting means for controlling the position of the first roller. Consequently the offset between the blade and first roller can be adjusted. Here the offset setting means is adapted to receive a signal from a carpet-thickness identification means in order to set the offset between the blade and first roller for each specific carpet being processed.

Preferably, the carpet-pile removal machine is arranged to feed carpet towards the blade in a substantially linear line. However it is advantageous if the carpet-pile removal machine includes a lower, second roller positioned beneath the blade. Here it is advantageous if the carpet is arranged to be urged towards the blade until the carpet has passed the lower roller. In contrast to known splitting machines that feed the leather onto a table (i.e. that finish directly feeding the leather toward the blade before the leather reaches the lower roller), this is advantageous as it enables the machine to be guarded and improves the automation. Preferably the lower roller may be moveably mounted with respect to the blade. Here, an axis of the lower roller is moveable toward and away from the upper roller and blade in a parallel motion. Suitably, the lower roller is biased to move toward the blade. The biasing is preferably such that as carpet is fed through the machine, the lower roller can float to accommodate different pile thicknesses. This is advantageous as it allows the carpet-pile removal machine to accommodate different size carpets. Advantageously, because the roller may be biased towards the upper roller, this ensures that the underside of the carpet is in contact with the upper roller. Moreover, without the lower roller floating, the carpet risks jamming the machine. In contrast to known leather splitting machines, wherein thickness variations are accommodated by having a first segmented rubber roller acting on a second, larger roller, the parallel float (which would not be suitable for processing leather) enables the machine to operate with reduced clogging risk.

An optional feature of the carpet-pile removal machine is to include a movable flap for diverting portions of pile, and particularly portions of pile severed from a leading edge of a piece of carpet, from the pile collection.

Suitably the carpet-pile removal machine includes first and second opposed grinding wheels for maintaining a sharpness of the blade. Here it is preferable for the carpet-pile removal machine to include optical sensing means for monitoring the grinding area. Thus the optical sensing means may be used to determine grinding characteristics and set the advancement of the grinding wheels accordingly.

Preferably, the carpet-pile removal machine includes at least one, but preferably a plurality of, pushers for maintaining the blade in position relative to the first roller in a carpet moving direction. Here the moveable pusher is arranged to press the back of the blade. Consequently, the pusher can be moved towards the first roller in order to maintain the blade edge in position as it is worn away. Advantageously, the carpet-pile removal machine may include a pressure monitoring means and a pressure adjusting means. Here, the pressure monitoring means monitors the pressure that the blade pushes backwards against the pusher and controls the pressure adjusting means to maintain the pressure above and/or below a predetermined threshold. Suitably, the pressure adjusting means comprises means to tilt one or both blade driving wheels in order to urge the blade to move along the axial direction of the blade driving wheel. Consequently, pressure can be applied or relieved from the pusher as required.

It will be appreciated that whilst the carpet-pile removal machine has been described in relation to a carpet handling system, it could be used independently or in conjunction with alternative systems. Moreover, each improvement, for instance the floating lower roller, continuous feed, diverting flap and grinding monitoring may be used independently, or in conjunction with other machines and on there own or in combination with other features described herein.

According to a third aspect of the present invention there is provided a carpet handling system. The carpet handling system includes a conveyor and carpet-thickness identification means. The carpet-thickness identification means may be as described in accordance with previous aspects. The conveyor is suitable for moving carpet along a linear path from one end toward a carpet-pile removal machine. Suitably, the carpet-thickness identification means is arranged in the middle of the conveyor. Here the conveyor comprises first and second conveyor belts arranged in spaced arrangements. Thus the carpet-thickness identification means is able to be arranged in the space therebetween.

Again, whilst the carpet handling system has been described in relation to feeding a carpet-pile removal machine, it will be recognised that it can be used independently, and in conjunction with other suitable systems or machines.

According to a fourth aspect of the present invention there is provided a method of recycling carpet comprising urging carpet through or toward a carpet-pile removal machine in order to sever the pile from the backing substrate. Here the method comprises using a carpet recycling machine or carpet-pile removal machine or carpet handling system substantially as in accordance with the previous aspects.

For a better understanding of the invention, and to show how embodiments of the same may be carried into effect, reference will now be made, by way of example, to the accompanying diagrammatic drawings in which.

Figure 3:
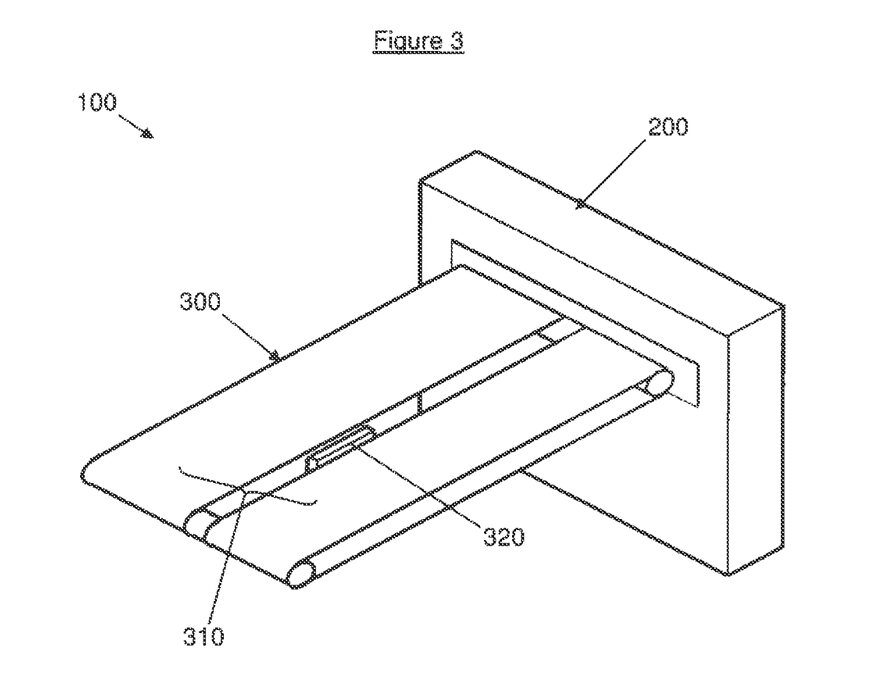
FIG. 3 shows a pictorial perspective view of a carpet recycling machine in accordance with a first aspect of the present invention.
Figure 4:
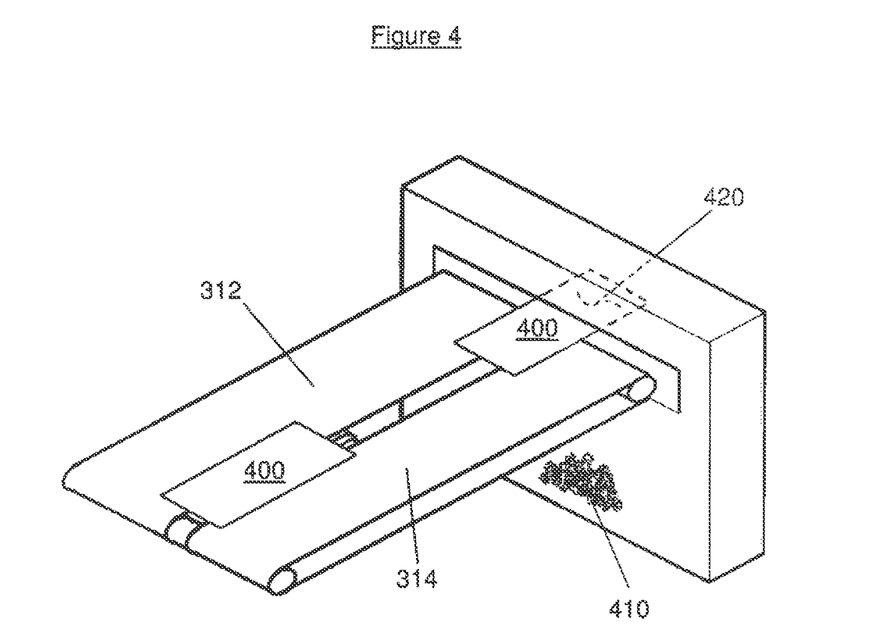
FIG. 4 shows the carpet recycling machine of FIG. 3 processing pieces of carpet.

FIG. 3 shows a carpet recycling machine 100. The carpet recycling machine 100 comprises a carpet-pile removal machine 200 and a carpet handling system 300. In use, carpet 400 is placed pile down on one end of the carpet handling system 300, which feeds the carpet 400 into the carpet-pile removal machine 200. The carpet-pile removal machine 200 processes the carpet 400, separating it in to pile 410 and backing substrate 420 as shown in FIG. 4.

As with known splitting machines, the carpet-pile removal machine 200 comprises a horizontally mounted, continuous blade arranged offset from an upper roller. Thus, as will be herein described, as carpet is fed into the carpet-pile removal machine 200 the continuous blade severs pile 410 from the backing substrate 420 of the carpet 400. It will be appreciated that the amount of pile 410 cut from the backing substrate 420 is determined by the offset between the blade and upper roller. This offset is controlled by an offset setting means, which is able to move the upper roller in order to set the offset.

The carpet handling system 300 comprises a movement means, such as a continuous movement means, which is shown in FIG. 3 as suitably comprising a conveyor 310 such as a belt type conveyor system. Thus, carpet 400 can be placed on the conveyor 310 at the end opposite to the carpet-pile removal machine 200 and consequently be transported along the carpet handling system 300 to be fed into the carpet-pile removal machine 200. The carpet handling system 300 further includes carpet-thickness identification means 320. The carpet-thickness identification means 320 is able to detect the thickness of the backing substrate 420 of each piece of carpet 400 that passes along the conveyor 310. Furthermore the carpet-thickness identification means 320 is connected to the offset setting means of the carpet-pile removal machine 200 to set the offset between the upper roller and blade. Consequently, as shown in FIG. 4, as a piece of carpet is moved along the conveyor the carpet-thickness identification means 320 detects the thickness of the backing substrate 420 of each piece of carpet 400 so that, when that piece of carpet 400 arrives at the carpet-pile removal machine 200, the offset between the upper roller and blade has been set for that piece of carpet 400 such that a minimal amount of pile 410 is left on the backing substrate 420 and without risking contaminating the removed pile 410 with pieces or scalpings of the backing substrate 420. As shown in FIG. 4 the severed pile 410 can be collected and re-used in any well known manner. Likewise, the backing substrate 420 can be removed from the carpet-pile removal machine 200 and recycled.

Figure 5:
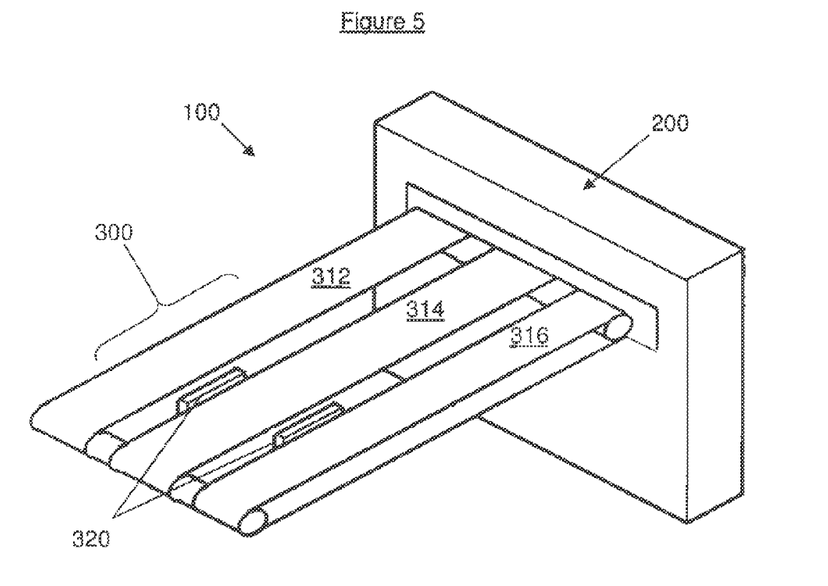
FIG. 5 shows a pictorial perspective view of a carpet recycling machine according to a second embodiment of the present invention.

FIG. 5 shows an alternative recycling machine 100 wherein the carpet handling system 300 includes two carpet-thickness identification means 320. This allows an average reading to be taken of the thickness of the carpet's backing substrate 420. This is advantageous as it guards against an incorrect reading for instance, if a specific area of the carpet 400 being measured comes from an area of carpet that has had heavy foot traffic or furniture placed on top, which would result in the backing substrate 420 being compacted or worn down and not therefore be indicative of the true carpet thickness. It will be appreciated that any number of carpet identification means 320 can be incorporated depending on the application. For instance dependant on the width of a piece of carpet 400 being processed. Whilst the carpet identification means 320 may be placed in any convenient location on the carpet handing system 300 it has been shown in FIGS. 3 and 4 as being located in the middle of the conveyor. This is advantageous as it decreases the likelihood of a piece of carpet 400 not passing over the carpet-thickness height identification means 320 and therefore not being detected. Consequently the conveyor is shown as first and second conveyor belts 312, 314 respectively having a space there between to accommodate the carpet-height identification means. In FIG. 5, the conveyor 310 is shown as first, second and third conveyor belts 312, 314 and 316 in order to provide two spaces therebetween each for accommodating a carpet-thickness identification means 320.

In order to improve the automation of the carpet recycling, it is advantageous to include each carpet thickness identification means as part of the carpet handling system 300. However, it will be appreciated that the carpet-thickness identification means 320 could equally be assembled to form part of the carpet-pile removal machine 200. Thus, whilst advantageous as it improves the automation of the recycling machine 100 the movement means 310 is a preferable feature.

Figure 6:
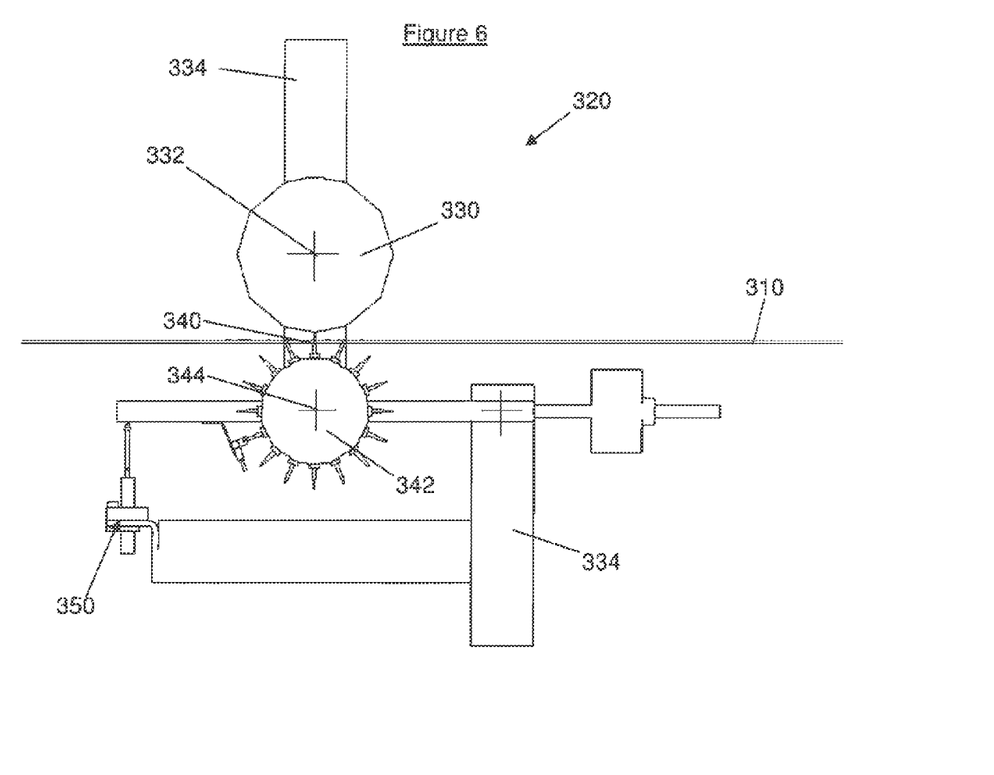
FIG. 6 shows a schematic side view of a carpet-thickness identification means of FIG. 6 for use in the carpet recycling machine of the present invention.

FIG. 6 shows a particularly suitable carpet-thickness identification means 320. Here the carpet-thickness identification means 320 comprises an anvil 330 and an opposed movable probe 340. The anvil provides a fixed datum point against which a back of a piece of carpet 400 can contact. The opposed moveable probe 340 is mounted such that it can be urged away from a rest position, wherein the probe is in contact with the anvil, as a piece of carpet 400 is urged to move between the two parts 330, 340. The opposed moveable probe 340 is designed to be able to penetrate through the carpet's pile 410, but not to be able to penetrate the carpet's backing substrate 420. For instance, the opposed moveable probe 340 may be a needle-like shape having a diameter and profile such that it can part the pile, penetrating down to the backing substrate. To aid this, the carpet-thickness identification means 320 may include a biasing means to apply a bias to the moveable probe 340. Consequently, a slight pressure acting on the carpet's backing substrate can be applied between the probe and anvil.

The carpet-thickness identification means further includes a deflection measurement means 350. The deflection measurement means 350 is calibrated to detect the amount of movement of the moveable probe from its rest position and a position wherein the carpet's backing substrate is located between the probe and anvil. Thus the deflection measurement means 350 is able to measure the thickness of each piece of carpet 400 and, by communicating with the offset setting means, adjust the offset between the blade and upper roller to ensure the carpet-pile removal machine 200 severs each individual piece of carpet to remove the optimal amount of pile 410. It will be appreciated that the deflection measurement means may set the offset to be equal to the deflection (or average deflection as the case may be when more than one carpet-thickness identification means is used). Alternatively, the deflection measurement means 350 may add or subtract a tolerance to the measured deflection. It is preferable for the carpet-thickness identification means to measure the thickness of the carpet's backing substrate at a number of positions as the carpet moves past the carpet-thickness identification means in order to eliminate any errors. For instance, miss-measurements may occur if the probe 340 contacts an area that was subject to heavy foot traffic or if a piece of pile gets trapped between the probe and backing substrate. The multiple measurements may be timed using a standard shift register. Shift register will be well known to those skilled in the art and is a method of using a sensor for detecting a leading edge of a piece of carpet, and then being able to track the carpet 400 along the conveyer 310 knowing its location at any given point in time. It will be appreciated that it is this technique that allows the offset setting means to know when a particular piece of carpet 400 is about to enter the carpet-pile removal machine 200 in order for it to set the offset to the correct setting as measured by the carpet-thickness identification means 320. Thus the offset setting means may include a memory to store the data supplied by the deflection measurement means 300. Since it may take some time for the carpet-pile removal machine 200 to adjust to a new offset, particularly if a large range of carpet thicknesses are being processed, the offset setting means may communicate with the carpet handling system 300 to slow the conveyor 310.

As described above, a particularly suitable method is to constantly change the off-set for each measured carpet. However, it has been found that the machine can accommodate slight differences, so in an alternative exemplary embodiment, the off-set is only changed if the thickness of the new carpet being introduced to the blade is outside a predetermined tolerance range of the current off-set.

Referring still to FIG. 6, the anvil 330 is shown here as a cylindrical roller, which is rotatable about axis 332 that is parallel to the conveyor 310 and extends substantially perpendicularly to the direction of travel. It is preferable for the anvil to be mounted in a rotatable arrangement in order to avoid carpet from snagging on the anvil. The axis 332 is held fast relative to a portion of the carpet handling system's frame 334. It is not necessary for the anvil to be driven. It is sufficient, and advantageous, to be freely rotatable as this reduces the size, weight and complexity of the machine. The anvil 330 may be common for a number of carpet-thickness identification means 320.

As shown in FIG. 6, it is preferable for the carpet-thickness identification means 320 to include a plurality of probes 340. Here each probe is mounted to a rotatable carousel 342, with each probe being mounted to face outwardly in a circumferential arrangement. Thus each probe is arranged on a radial line from a rotation axis 344 of the carousel 342. Suitably therefore, each probe is moveably mounted with respect to the anvil by moveably mounting the axis 344 of the carousel 342 with respect to a portion of the carpet handling system's frame 334. Advantageously, by mounting each probe on a rotatable carousel, the measurement accuracy is improved as the chance of the probe not fully penetrating the pile is reduced. This is because, as the carpet passes under the anvil and the carousel rotates, a new probe begins to penetrate the pile. This has the affect of sweeping aside pile as the probe penetrates further. In contrast, if the probe was simply oscillated in a linear movement, there is a greater risk of trapping pile between the probe and backing substrate.

In order to reduce the weight and complexity of the machine, it is preferable for the carousel to be freely rotatable. Thus, referring to FIG. 8, as a leading edge 402 of a piece of carpet approaches the carpet-thickness identification means 320, one of the plurality of probes will be arranged to restrict the carpets movement under the anvil. The leading edge 402 therefore abuts the probe. As the carpet is urged under the anvil by the conveyor 310, the probe is urged to move thereby rotating the carousel. As the carousel rotates, a new probe moves towards the carpet and begins to penetrate the pile, and so on until the carpet has passed fully under the anvil. It will therefore be appreciated that the number of probes on the carousel needs to be sufficient such that a second probe is brought into contact with the carpet before the first probe moves clear. With this regard, when tips of each probe are arranged about a circumferential path having a radius of approximately 75 mm it has been found that fewer than 8 probes may start to cause intermittent movement of the carousel wherein all the probes are clear of the carpet. Moreover, if the carousel contains too many probes, the pile displaced from one probe may interfere with the penetration of a neighbouring probe. Again, with the tips arranged on a radius of around 75 mm it has been found that more than 34 probes begin to cause pile displacement to interfere with the penetration of a neighbouring probe.

Figure 7:
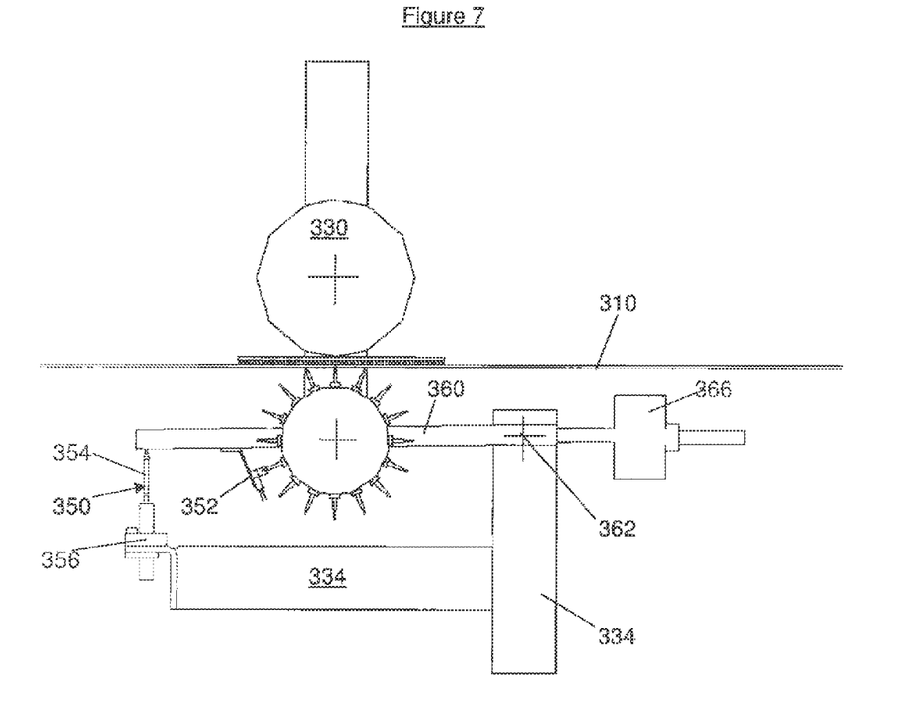
FIG. 7 shows the carpet-thickness identification means processing a piece of carpet.

When a rotatable carousel is used, it is necessary to ensure that the deflection measurement means 350 takes a reading when the probe is arranged substantially vertically beneath the datum point of the anvil. Thus, as shown in FIG. 7, it is preferable for the probes to be evenly spaced around the carousel. Here a measurement trigger 352, such as a non-contact sensor may be used to trigger a reading when a probe is in the correct position. As shown, the measurement trigger 352 may be arranged to detect the position of a probe other than the probe in contact with the backing substrate.

Figure 8:
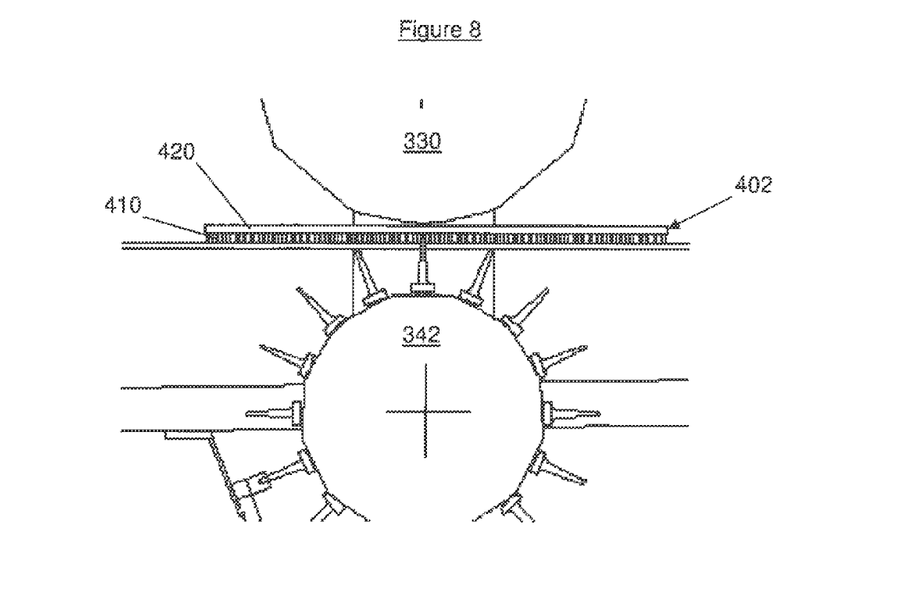
FIG. 8 shows an enlarged view of a portion of FIG. 7.

In FIGS. 6-8, the deflection measurement means 350 is shown as suitably comprising a linear transducer. The transducer has a piston 354 that is moveable relative to a body 356. The body 356 is held fast to a portion of the carpet handling system's frame 334. Consequently, the linear transducer can be calibrated to measure the amount of deflection of the probe from its rest position in contact with the anvil. Whilst, in the Figures, a linear transducer is shown as being particularly suitable, the deflection measurement means may comprise any well-know method capable of measuring the deflection of the probe.

A number of options are available in order to mount the carousel 342 in a moveable arrangement. For instance, the carousel 342 may be mounted to a slider that is moveable linearly with respect to a portion of the carpet handling system's frame 334. However, as shown in FIGS. 6-8, a particularly suitable mounting option is to rotatably mount the carousel 342 to a pivoted beam 360. Here the beam 360 pivots relative to a portion of the carpet handling systems frame 334 at pivot 362. The pivotal connection 344 of the carousel to the beam 360 is spaced from the pivot 362. Thus, as a piece of carpet urges the probe away from the anvil, the beam pivots with respect to the frame. Here the displacement measurement means 350 is arranged beneath a distal end of the beam 360. However, the displacement measurement means 350 may operate equally effectively when arranged to measure the displacement of other portions of the beam, carousel or probe.

Mounting the carousel on a pivoted beam 360 is particularly suitable as it allows a biasing means to be simply applied. For instance, as shown in the Figures, suitably the beam extends from the other side of pivot 362 to the carousel. A counter balance 366 is attached to this portion of the beam. The counter balance thereby providing a rotational force to urge the beam to rotate in order to move the carousel 342 towards the anvil 330. Although other options may be used to apply the biasing means to urge the beam to rotate towards the anvil, the counterbalance is particularly advantageous as it allows the biasing force to be easily adjusted, simply by moving the counterbalance towards or away from the pivot 362. The biasing force needs to be sufficient to cause the probe 340 to press the carpet 400 tightly against the anvil 330, but not so much that the probe 340 begins to indent or penetrate the carpet's backing substrate. Where necessary, a damping device may be added to damp the rotation of the beam 360.

Although FIGS. 6-8 describe a particularly suitable carpet-thickness identification means 320, other options have been considered. For instance, an alternative may be to cause the carpet to pass over a series of rollers, arranged in order to cause the carpet to bend about a suitably small radius. Thus, by bending about a small radius, with an underside of the backing substrate is in a concave arrangement, the pile is forced to open up. Thus, it may be possible to use a non-contact measurement means, such as a laser beam, to measure the thickness of the backing substrate by being directed onto the backing substrate directly due to the pile being opened up as it wraps around the roller.

Figure 9:
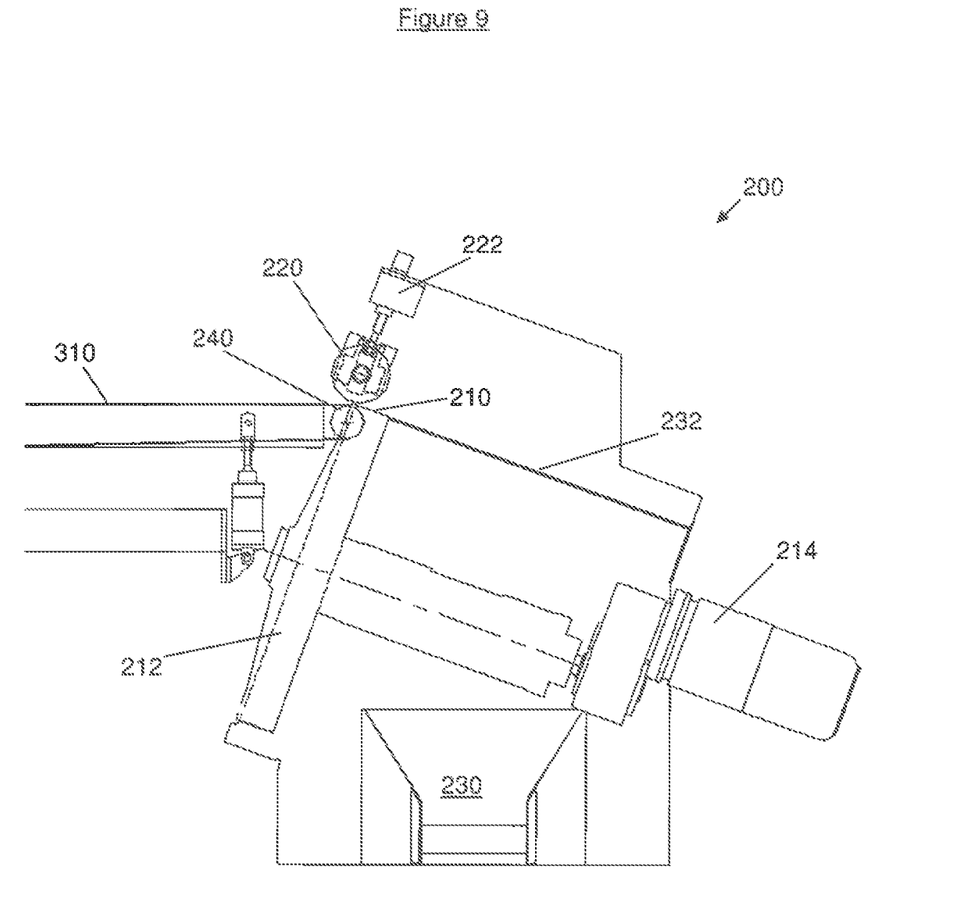
FIG. 9 shows a cross-sectional side view of a carpet-pile removal machine for use in the carpet recycling machine of the present invention.

Referring now to FIG. 9, the carpet-pile removal machine is described in more detail. Whilst the carpet handling system described herein may be used to feed a conventional splitting machine, it has been found that the automation of the process is hindered and a problem occurs with the known splitting machine sometimes slicing through the backing substrate as the carpet's leading edge enters the machine. A number of improvements have therefore been proposed. However, many of the parts of the carpet-pile removal machine 200 remain the same so a detailed description is not given here. Rather, for a detailed description, attention is directed towards the known splitting machines. Briefly however, the carpet-pile removal machine includes a band type blade 210 that is driven in a continuous loop by a pair of end wheels 212 that are driven by motor 214. The blade's edge is arranged horizontally across an entrance to the carpet-pile removal machine 200. An upper roller 220 is provided above the blade. The distance or offset between the blade and upper roller determines the height the carpet is severed taken from the underside of the carpet. The upper roller 220 is mounted so as to be moveable relative to the blade in order to alter the cutting height. Here, offset setting means 222 is provided to control the position of the upper roller 220. As the carpet is processed pile down, the pile falls under gravity once it has been severed from the backing substrate. Thus a collection trough 230 is provided. The base of the trough 230 may include a moveable conveyor in order to transport the severed pile for further processing. A divider 232 is provided to remove the backing substrate.

The improvements will now be described. Whilst the improvements have been described in relation to a carpet-pile removal machine suitable for a specific use, the improvements may be used independently to improve other machines.

Rather than the conveyor 310 of the carpet handling system 300 feeding the carpet on to a platform, the conveyor is shown in FIG. 9 as feeding directly into the carpet-pile removal machine 200. This is advantageous as it improves the automation and allows the entrance to the carpet-pile removal machine to be guarded. Moreover, the path of the carpet is kept as a straight line, whereas in known splitting machines the carpet often has to bend. This is advantageous as it has been found to reduce the risk of the blade cutting part of the backing substrate as it cuts the leading edge.

A number of improvements have been made to reduce the problem associated with processing the leading edge of the carpet 400. The upper roller 220 has been made larger. This enlarged diameter gives the roller more rigidity and reduces the risk of the roller bending especially when adapted to process large width carpets. It has also been found preferable to mount an axis of a lower roller 240 (shown in FIG. 9 as the end roller of the conveyor 310) moveably with respect to the blade 210. The floating, lower roller is advantageous as it allows the machine to accommodate for different height carpets. It is further preferable for the lower roller to be biased towards the upper roller. This is advantageous as it ensures the underside of the carpet 400 is pressed against the upper roller 220, which ensures the carpet 400 is cut at the correct height and reduces the leading edge problem by reducing the tendency of the carpet to bend at the leading edge. The float of the lower roller helps ensure that the carpet does not jam between the two rollers. Also, the nip formed between the rollers prevents the tendency of the carpet to move sideways as the cutting blade begins severing the carpet.

An optional feature of the carpet-pile removal machine 200 (not shown) is to include a diverting flap underneath the blade 210. Here, the diverting flap may be moved between a deployed and stowed position. For instance, the flap may be an air-operated flap. Here, when in the deployed position, the diverting flap extends underneath the blade in order to catch and divert any severed pile towards a waste collection. When in the stowed position, the flap is clear of the severed pile's path such that it is collected by the trough 230. Hence, when the carpet-pile removal machine begins to process a leading edge, the flap can be deployed. Thus, if the leading edge catches such that a portion of the backing substrate is severed, it is diverted to waste rather than allowed to contaminate the severed pile.

Figure 10:
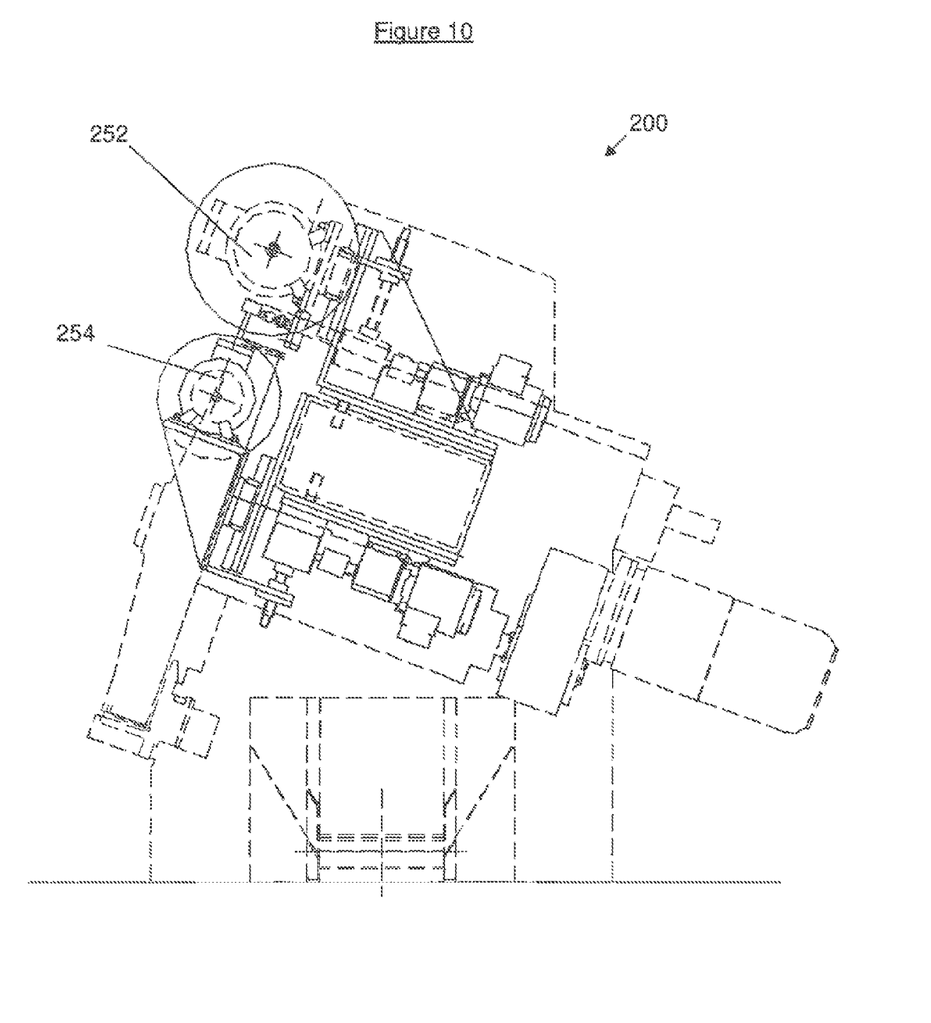
FIG. 10 shows a side view of FIG. 9

As shown in FIG. 10, as with conventional splitting machines, it is preferable for the carpet-pile removal machine 200 to include grinding wheels 252,254 for maintaining the sharpness of blade 210. The grinding wheels are moveable in a first direction, towards and away from the blade in order to compensate for the wearing of the grinding wheels. The wheels are also moveable in a second direction, parallel to the width of the blade in order to change the profile of the blade's 310 edge. It is preferable for the carpet-pile removal machine 200 to include automated means for moving the grinding wheels in at least the first direction. This is advantageous over known splitting machines which require the wheels to be moved by hand, as it reduces operator input and allows the machine to be better guarded. A particularly suitable automated means comprises mounting optical sensing equipment such as digital cameras to monitor the grinding area. By monitoring the grinding area an operator can identify when the grinding wheels have worn such that they are not grinding the blade by the absence of sparks. Moreover, it has been found that the colour spectrum of the grinding can be correlated for each type of grinding wheel material and blade material to determine when optimal grinding is achieved. For instance a yellow spectrum may indicate that good grinding is occurring, whereas a red spectrum may indicate that too much grinding is occurring. The optical sensing equipment may include automatic colour identification software and therefore be completely automated. It is thought that this sharpness monitoring or level of grinding monitoring may be applicable to other grinding applications. As an alternative to full automation, the movement of the grinding wheels towards and away from the blade when the machine is turned on/off may be automatic with the final, fine adjustment being done manually, as in the prior art.

As it will be appreciated, the sparks from the grinding wheels may cause a fire hazard. Fire hazard detection and suppression means may therefore be included as is well know in the art.

It has been found that it is preferable to have greater monitoring of the blade than with conventional splitting means. For instance, it is preferably if the load of the motor driving the blade is monitored. Thus, if the load increases, which is indicative of the blade becoming blunt and requiring greater effort to severe the pile, the feed rate of the carpet into the machine can be slowed in order to give the blade time to sharpen. Additionally or alternatively, a pusher (or plurality of spaced pushers) can be used at the back of the blade to maintain the blades cutting edge in position as it is worn away. For instance, an automatic tracking mechanism is used to monitor the front edge of the blade and as the blade is worn away, the pusher(s) are incremented forward to maintain the precise location of the blade. However, in doing so, as the carpet is fed into the blade, a pressure is applied urging the blade backwards against the pusher(s). If this pressure gets to high, excessive heat can build up. Surprisingly however, if the pressure gets too low, the blade has a tendency to jump forward, biting into the carpet. Consequently, it is preferable to include a pressure monitoring means and a pressure adjusting means. Suitably, the pressure monitoring means measures the pressure applied by the blade on the pusher(s). For instance a transducer or other load measuring device can be arranged to support one or all of the pushers and therefore monitor the backward pressure (e.g. away from the blade). Here, the pressure adjusting means is arranged to change the backward pressure applied by the blade in order to keep the measured pressure within a suitable tolerance. Suitably, the pressure connection means may be mounting one or both wheels that drive the blade so that they can tilt. That is, so that the circumference of the wheels can be angled with respect to the length of the cutting blade. As a result, by tilting the wheel one way, the blade can be urged to move axially (with respect to the driving axis of the wheel) away or toward the pusher and tilting the wheel the other way, urges the blade to move the other way from the pusher. Consequently, the pressure adjusting means can be used to adjust the back pressure on the pusher(s) to maintain the pressure within correct operating parameters.

Figure 11:
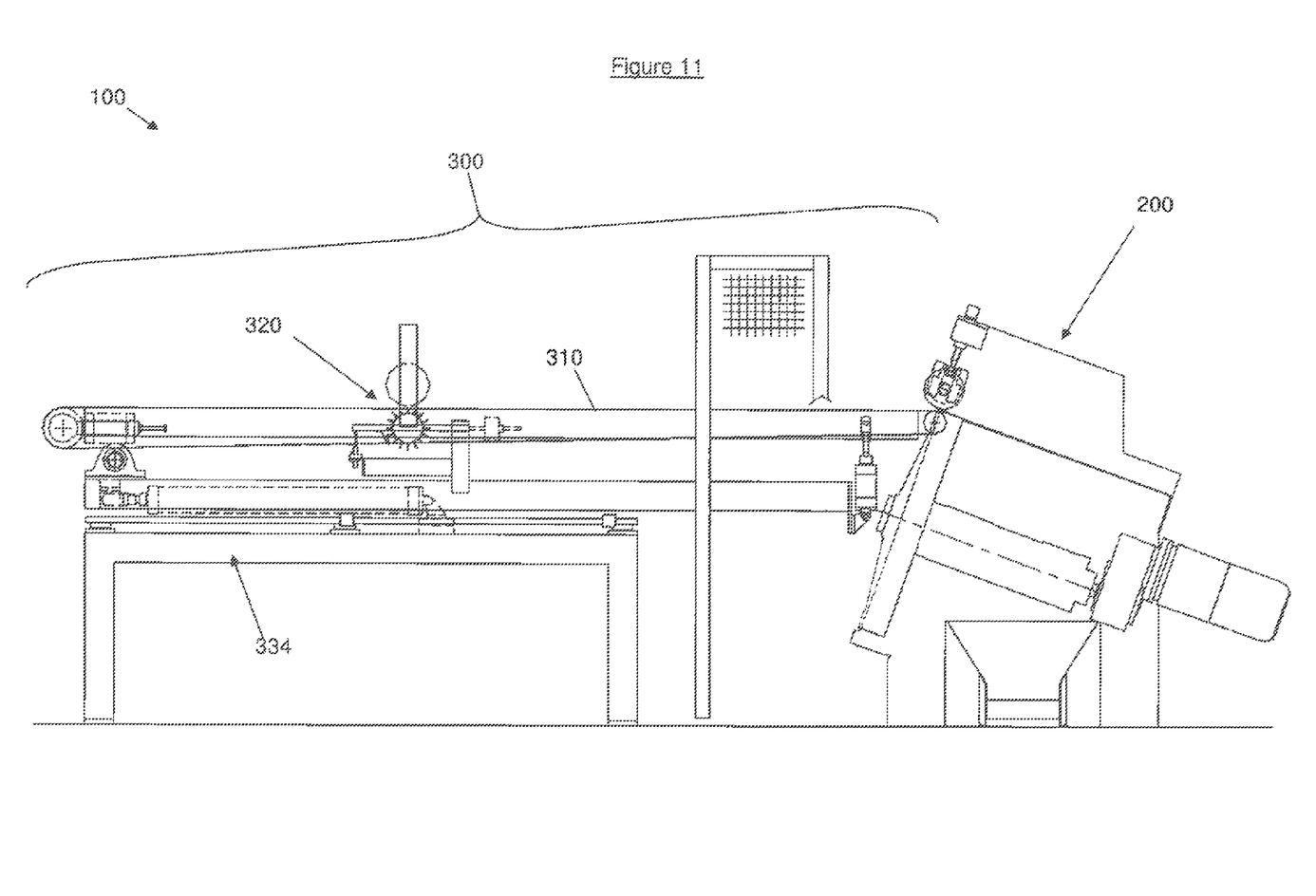
FIG. 11 shows a cross sectional view of a carpet recycling machine in accordance with the present invention.

Referring to FIG. 11, a carpet recycling machine 100 is shown. The inclusion of a carpet-thickness identification means 320 enables the machine 100 to process multiple and random pieces of carpet 400 with out the need for time-consuming down time in setting up the machine 100 for each specific piece of carpet. Furthermore, the carpet handling system 300 enables the process to be fully automated and also allows the entrance to the carpet-pile removal machine 200 to be fully guarded. The carpet recycling machine 100 is also able to produce improved separation of the pile and backing substrate in that there is less cross-contamination.

It is recognised that the carpet recycling machine 100 as herein described may be deployed to process new or used carpet. A particular problem with processing used carpet is that dirt can degrade the machine (i.e. through blunting the blade or coming loose in the machine and firming up or jamming parts). Therefore it is recognised as being advantageous to include a cleaning station. The cleaning station may be arranged at the front end of the carpet handling system or incorporated therein. Here, it is preferable for the carpet cleaning station to be a dry operation. This is because processing wet carpet through the carpet-pile removal machine can clog up the machine and cause issues with rust. Thus it is proposed to use a beating means to beat the carpet in order to clean dirt.

Although preferred embodiment(s) of the present invention have been shown and described, it will be appreciated by those skilled in the art that changes may be made without departing from the scope of the invention as defined in the claims.

The invention claimed is:

1. A carpet recycling machine comprising a carpet-pile removal machine and a carpet-thickness identification means wherein:
   the carpet-pile removal machine includes a blade, a first roller and an offset setting means, wherein the first roller is moveably mounted in a spaced relationship to the blade and the offset setting means controls the position of the first roller to determine the offset between the blade and first roller; and
   the carpet-thickness identification means is arranged to measure the thickness of a backing substrate of a piece of carpet being processed, the carpet-thickness identification means being arranged to communicate with the offset setting means in order to set the offset for each portion of carpet being processed;
   wherein:
   the carpet-thickness identification means comprises a probe that is moveable relative to a datum, wherein the piece of carpet being processed is arranged to pass between the probe and datum and wherein the probe is moved toward and away from the datum in a direction perpendicular to a plane of the carpet and in a direction of the plane of the carpet.

2. The carpet recycling machine of claim 1 comprising at least two carpet-thickness identification means.

3. The carpet recycling machine of claim 1 wherein the carpet recycling machine comprises a carpet handing system and the carpet-thickness identification means is arranged on the carpet handling system.

4. The carpet recycling machine of claim 3, wherein the carpet handling system includes a conveyor for urging a piece of carpet towards the carpet-pile removal machine.

5. The carpet recycling machine of claim 1 wherein the carpet-thickness identification means comprises an anvil, an opposed moveable probe and deflection measurement means, wherein the anvil provides a fixed datum point and the probe is movable by carpet being fed between the anvil and probe, the probe being moveable from a rest position wherein the probe restricts the path of the carpet, toward a position spaced further from the anvil, and the deflection measurement means is calibrated for determining the thickness of the backing substrate by monitoring the amount of movement of the probe.

6. The carpet recycling machine of claim 5, wherein the carpet-thickness identification means includes biasing means to bias the probe towards the anvil.

7. The carpet recycling machine of claim 5 wherein the carpet-thickness identification means includes a plurality of probes, wherein each probe is arranged on a circumferential location of a carousel and the carousel is rotatably mounted to a pivot that is movable with respect to the anvil.

8. The carpet recycling machine of claim 7, wherein the carousel is rotatably mounted to a beam and the beam is pivotally mounted with respect to the anvil.

9. A carpet-pile removal machine suitable for use in the carpet recycling machine of claim 1, wherein the carpet-pile removal machine comprises a blade, a first roller and an offset setting means, wherein the first roller is movably mounted in a spaced relationship to the blade and the offset setting means controls the position of the first roller to determine the offset between the blade and first roller, wherein the offset setting means is adapted to receive an input from a carpet-thickness identification means comprising a probe that is moveable relative to a datum, wherein the piece of carpet being processed is arranged to pass between the probe and datum and wherein the probe is moved toward and away from the datum in a direction perpendicular to a plane of the carpet and in a direction of the plane of the carpet.

10. The carpet-pile removal machine or carpet recycling machine of any claim 1 wherein the carpet-pile removal machine includes a second roller that is arranged on an opposite side of the blade to the first roller, wherein the carpet-pile removal machine is adapted to continually urge carpet towards the blade until the carpet has passed the second roller.

11. The carpet-pile removal machine or carpet recycling machine of claim 10, wherein the lower roller is movably mounted with respect to the blade.

12. The carpet-pile removal machine or carpet recycling machine of claim 11, wherein the second roller is biased towards the first roller.

13. The carpet-pile removal machine or carpet recycling machine of claim 1, wherein the carpet-pile removal machine includes a movable partition, the movable partition being movable between a deployed position, wherein the partition guides severed pile away from a collection pile, and stowed position wherein severed pile is guided towards the collection pile.

14. The carpet-pile removal machine or carpet recycling machine of claim 1, wherein the carpet-pile removal machine includes at least one pusher for pushing on a back of the blade in order to maintain the blades position, and a pressure monitoring means and pressure adjusting means that are arranged to correct the pressure that the backward pressure of the blade.

15. A carpet handling system for use in the carpet recycling machine of claim 1, the carpet handling system comprising a conveyor for urging carpet towards a carpet-pile removal machine and at least one carpet-thickness identification means for measuring the thickness of a backing substrate of a piece of carpet being processed, wherein the carpet-thickness identification means is adapted to communicate with an offset setting means of a carpet-pile removal machine.

* * * * *